United States Patent
Lee

(10) Patent No.: US 12,288,054 B2
(45) Date of Patent: Apr. 29, 2025

(54) METHOD OF GENERATING ROLLBACK DIFFERENCE DATA OF A VEHICLE CONTROLLER AND A METHOD OF ROLLBACK OF A VEHICLE CONTROLLER

(71) Applicant: HYUNDAI AUTOEVER CORP., Seoul (KR)

(72) Inventor: DeokJoo Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 188 days.

(21) Appl. No.: 18/076,891

(22) Filed: Dec. 7, 2022

(65) Prior Publication Data

US 2023/0176855 A1 Jun. 8, 2023

(30) Foreign Application Priority Data

Dec. 8, 2021 (KR) ........................ 10-2021-0174944

(51) Int. Cl.
| | | |
|---|---|---|
| G06F 8/30 | (2018.01) | |
| G06F 8/65 | (2018.01) | |
| G06F 8/71 | (2018.01) | |
| G06F 9/445 | (2018.01) | |
| G06F 9/455 | (2018.01) | |
| G06F 11/07 | (2006.01) | |

(52) U.S. Cl.
CPC . *G06F 8/65* (2013.01); *G06F 8/71* (2013.01)

(58) Field of Classification Search
CPC ... G06F 8/65; G06F 8/71; G06F 8/658; G06F 9/4401; G06F 8/30; G06F 8/62; G06F 11/1433; G06F 21/78; G06F 8/61; G06F 21/602; G06F 16/2379; G06F 21/51; G06F 9/445; G06F 3/0604; G06F 3/0673; G06F 3/0659; G06F 21/44; G06F 16/2365; G06F 21/57; G06F 8/654; H04L 67/34; B60R 16/023; B60R 16/03; B60R 16/0231; B60W 60/001; H04W 4/48; H04W 4/14; G07C 5/0808
See application file for complete search history.

(56) References Cited

U.S. PATENT DOCUMENTS

| | | | | |
|---|---|---|---|---|
| 11,360,761 | B2 * | 6/2022 | Farrell | ............ G06F 21/78 |
| 11,556,326 | B2 * | 1/2023 | Sillankorva | ............ G06F 8/30 |
| 2021/0157571 | A1 * | 5/2021 | Ogawa | ............ G06F 16/2379 |
| 2023/0004381 | A1 | 1/2023 | Ma | |

FOREIGN PATENT DOCUMENTS

| | | |
|---|---|---|
| JP | H07177244 A | 7/1995 |
| KR | 101822485 B1 | 1/2018 |
| WO | 2021168840 A1 | 9/2021 |

OTHER PUBLICATIONS

Office Action cited in the corresponding Korean patent application No. KR 10-2021-0174944; Oct. 17, 2024; 8 pp.

\* cited by examiner

*Primary Examiner* — Thuy Dao
(74) *Attorney, Agent, or Firm* — Lempia Summerfield Katz LLC

(57) ABSTRACT

Provided is a method for generating rollback difference data of a vehicle controller. The method includes receiving difference data for updating from old version data to new version data from a server, and generating rollback difference data for a rollback from the new version data to the old version data by using the difference data and the old version data.

10 Claims, 7 Drawing Sheets

METHOD OF GENERATING ROLLBACK DIFFERENCE DATA OF A VEHICLE CONTROLLER AND A METHOD OF ROLLBACK OF A VEHICLE CONTROLLER

CROSS-REFERENCE TO RELATED APPLICATIONS

This application claims priority to and the benefit of Korean Patent Application No. 10-2021-0174944, filed Dec. 8, 2021, the entire contents of which are incorporated herein by reference.

FIELD OF TECHNOLOGY

The present disclosure relates to a method of generating rollback difference data of a vehicle controller and a method of rollback of a vehicle controller.

BACKGROUND

Currently, various electronic devices for user convenience used in vehicles according to technological development, and an update technology for updating software or information in a vehicle controller for controlling various electronic devices is required.

In line with these demands, Over-The Air (OTA) update technology, which is capable of wirelessly updating software in the vehicle controller, instead of using a wired connection, is being developed. One of the update technologies is a differential update technology that updates only a changed part of all data for software update of various electronic devices.

On the other hand, in vehicles, as a countermeasure against version matching with other controllers or update failure, a rollback to return to the old version is sometimes required after the update from the old version to the new version is completed. Currently, for rollback, there is no choice but to download the old version again, but in this case, excessive time and data transmission are required, making it difficult to apply OTA technology.

The foregoing is intended merely to aid in the understanding of the background of the present disclosure, and is not intended to mean that the present disclosure falls within the purview of the related art that is already known to those having ordinary skill in the art.

SUMMARY

Aspects of the present disclosure provide a method of generating rollback difference data and performing rollback, which effectively perform rollback without re-downloading an old version.

Objects to be achieved by the present disclosure are not limited to the aforementioned objects, and other objects not-mentioned herein will be clearly understood by those skilled in the art from descriptions below.

An embodiment of the present disclosure provides a method for generating rollback difference data of a vehicle controller. The method includes: receiving, from a server, difference data for updating from old version data to new version data; and generating, using the difference data and the old version data, rollback difference data for a rollback from the new version data to the old version data.

The difference data may include a series of difference blocks, and the difference blocks may include an additional difference block having length information of additional data and additional data, an identical difference block having length information of same data, and a deletion difference block having length information of deleted data.

Generating the rollback difference data may include generating a deletion difference block having the length information from the additional difference block, generating an identical difference block having the length information from the identical difference block, and generating an additional difference block having the length information from the deletion difference block and additional data extracted from the old version data.

Generating the rollback difference data may be performed in advance before the update.

Generating the rollback difference data may include managing an index indicating a data location of the old version data. When the deletion difference block is generated from the additional difference block, the index may be maintained. When the identical difference block is generated from the identical difference block, the index may be increased by the corresponding length information.

When the additional difference block is generated from the deletion difference block, data corresponding to corresponding length information may be extracted from a location indicated by the index from the old version data as the additional data, and the index may be increased by the corresponding length information.

Generating the rollback difference data may comprise generating the rollback difference data simultaneously with the update.

Generating the rollback difference data simultaneously with the update may include managing a first index indicating a data location of the old version data and a second index indicating a data location of the new version data. When the additional difference block is applied in the update, the first index may be maintained, the additional data may be copied to a location indicated by the second index of the new version data, the second index may be increased by corresponding length information, and the deletion difference block may be generated from the additional difference block. When the identical difference block is applied in the update, data of the corresponding length information of the location indicated by the first index of the old version data may be copied to the location indicated by the second index of the new version data, the second index may be increased by the corresponding length information, the first index may be increased by the corresponding length information, and the identical difference block may be generated from the identical difference block.

When the deletion difference block is applied in the update, data of the corresponding length information may be extracted from the location indicated by the first index of the old version data as the additional data to generate the additional difference block, the first index may be increased by the corresponding length information, and the second index may be maintained.

Another example embodiment of the present disclosure provides a method of rollback of a vehicle controller. The method includes receiving, from a server, difference data for updating from old version data to new version data, generating, using the difference data and the old version data, rollback difference data for a rollback from the new version data to the old version data, and performing rollback from new version data to old version data by using the rollback difference data.

The rollback difference data may include a series of differential blocks. The difference blocks may include an additional difference block having length information of additional data and additional data, an identical difference block having length information of same data, and a deletion difference block having length information of deletion data.

Performing the rollback may include managing a first index indicating a data location of the new version data and a second index indicating a data location of the old version data. When the additional difference block is applied in the rollback, the first index may be maintained, the additional data may be copied to the location indicated by the second index of the old version data, and the second index may be increased by corresponding length information. When the identical difference block is applied in the rollback, data of the corresponding length information of the location indicated by the first index of the new version data may be copied to the location indicated by the second index of the old version data, the second index may be increased by the corresponding length information, and the first index may be increased by the corresponding length information. When the deletion difference block is applied in the rollback, the first index may be increased by the corresponding length information, and the second index may be maintained.

According to embodiments of the present disclosure, it is possible to effectively perform rollback without re-downloading the old version by generating rollback difference data by using the old version data of the vehicle controller and the received difference data, and performing rollback by using the rollback difference data when rollback is necessary.

The effects of embodiments the present disclosure are not limited to the effects mentioned above, and other effects not mentioned will be clearly understood by those skilled in the art from the following description.

The foregoing summary is illustrative only and is not intended to be in any way limiting. In addition to the illustrative aspects, example embodiments, and features described above, further aspects, embodiments, and features will become apparent by reference to the drawings and the following detailed description.

BRIEF DESCRIPTION OF THE DRAWINGS

In order that the disclosure may be well understood, there will now be described various forms thereof, given by way of example, reference being made to the accompanying drawings, in which.

Figure 1:
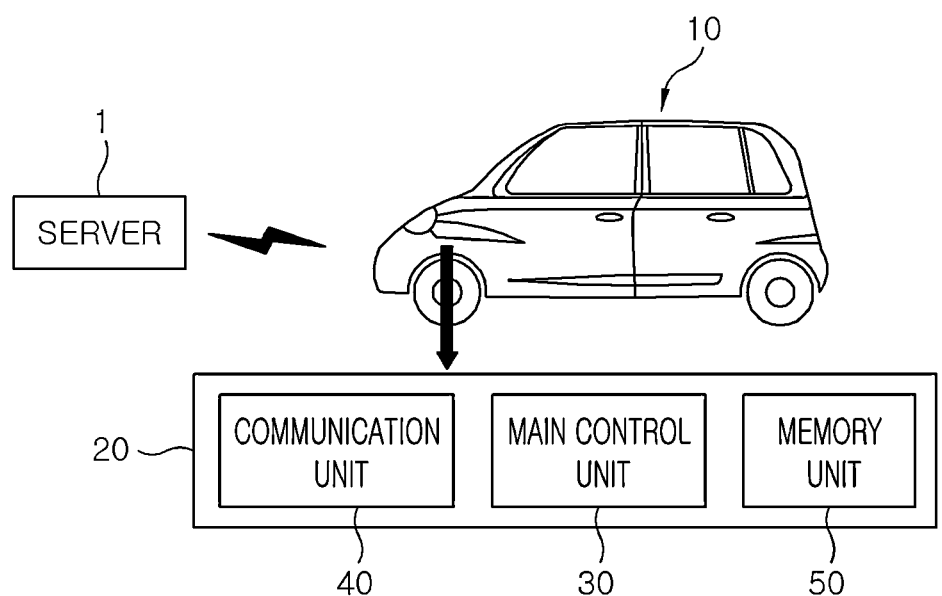
FIG. 1 is a diagram illustrating a system configuration in which a method for generating rollback difference data of a vehicle controller and performing rollback according to embodiments of the present disclosure may be implemented.

It should be understood that the drawings are not necessarily to scale, presenting a somewhat simplified representation of various features illustrative of the basic principles of the disclosure. The specific design features of the present disclosure, including, for example, specific dimensions, orientations, locations, and shapes can be determined in part by the particular intended application and use environment.

In the figures, reference numerals refer to the same or equivalent parts of the present disclosure throughout the several figures of the drawing.

DETAILED DESCRIPTION

Hereinafter, embodiments of the present disclosure are described in detail with reference to the accompanying drawings. In the following description and the accompanying drawings, substantially the same components are denoted by the same reference numerals respectively, and thus redundant descriptions are omitted. In addition, if it is determined that a detailed description of a related known function or configuration may unnecessarily obscure the gist of the present disclosure, a detailed description thereof is omitted.

FIG. 1 is a diagram illustrating an example system configuration in which a method for generating rollback difference data of a vehicle controller and performing rollback according to embodiments of the present disclosure may be implemented.

Referring to FIG. 1, a server 1 and a vehicle 10 may be connected through wireless communication for over-the-air (OTA) differential update.

The vehicle 10 may include at least one vehicle controller 20. The vehicle controller 20 may perform a function of electrically controlling a specific part of the vehicle 10 or providing specific information to a driver. The vehicle controller 20 may include a main control unit 30 providing main functions, a communication unit 40 performing communication with the outside, such as the server 1, and a memory unit 50 storing data, such as software or information.

When data stored in the memory unit 50 needs to be updated, the server 1 transmits difference data for updating the difference from an old version data to new version data, and the vehicle controller 20 receives the difference data via the communication unit 40. The main control unit 30 performs an update from the old version data stored in the memory unit 50 to the new version data by using the difference data.

In an embodiment, the main control unit 30, upon receiving the difference data, generates rollback difference data to enable a future rollback from the new version data to the old version data using the difference data and the old version data currently stored in the memory unit 30, and stores the generated rollback difference data in the memory unit 50. Further, when the rollback is requested due to version matching with other controllers or update failure, the main control unit 30 performs rollback from the new version data to the old version data by using the rollback difference data stored in the memory unit 50.

Figure 2:
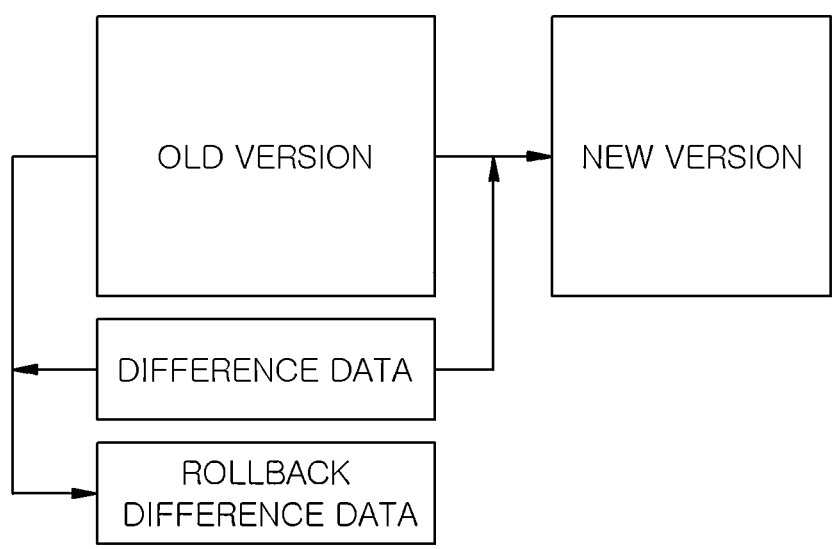
FIG. 2 is a diagram illustrating update from old version data to new version data and generation of rollback difference data according to an embodiment of the present disclosure.

FIG. 2 is a diagram illustrating an update from old version data to new version data and generation of rollback difference data, according to an embodiment. Referring to FIG. 2, the old version data is updated to the new version data by using the difference data, and rollback difference data is generated from the old version data and the difference data.

Figure 3:
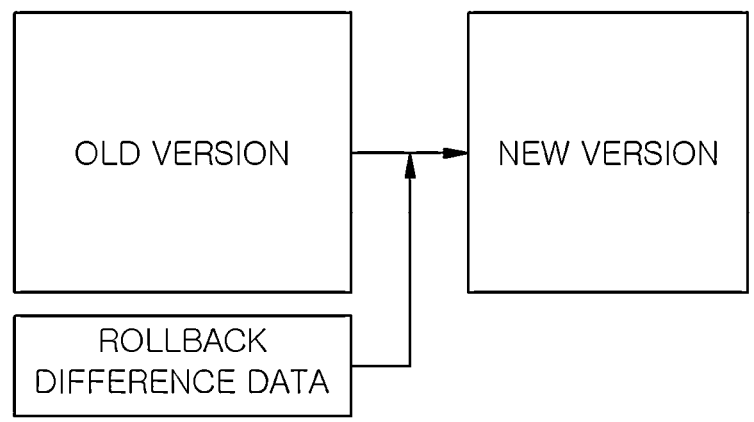
FIG. 3 is a diagram illustrating rollback from new version data to old version data according to an embodiment of the present disclosure.

FIG. 3 is a diagram illustrating a rollback from new version data to old version data, according to an embodiment. Referring to FIG. 3, the new version data is rolled back to the old version data by using the rollback difference data.

Figure 4:
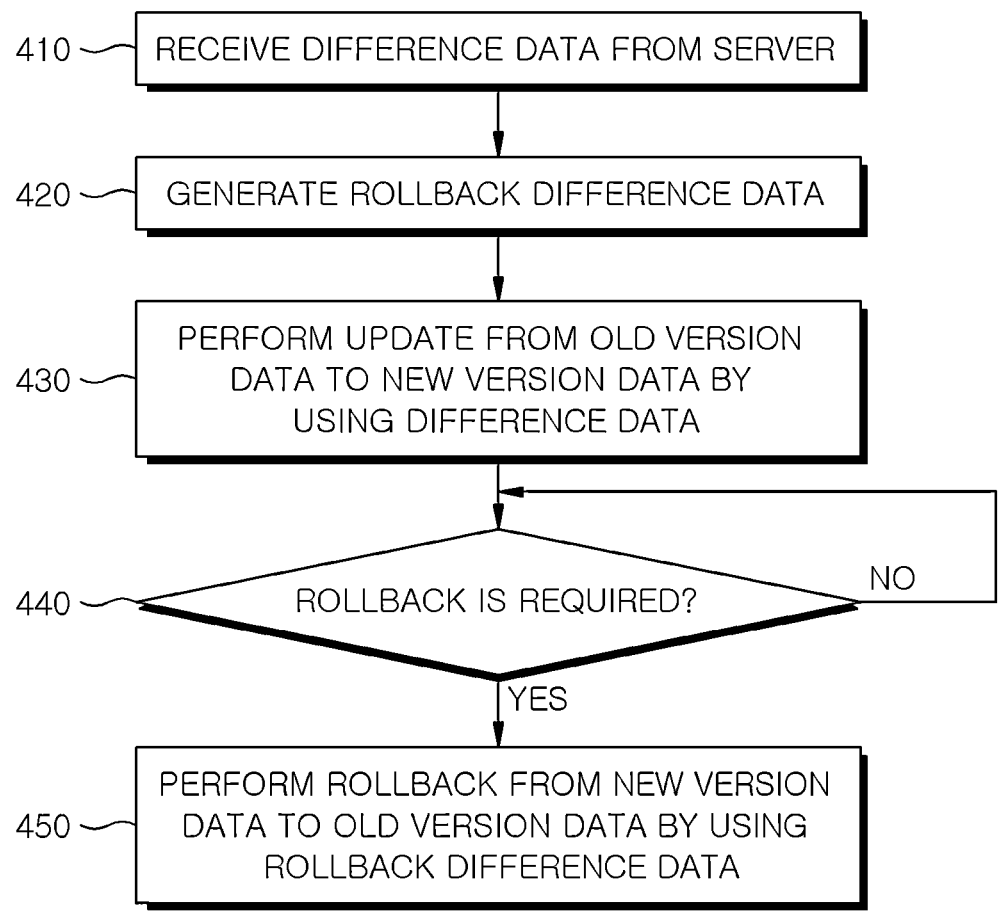
FIG. 4 is a flowchart of a method for generating rollback difference data of a vehicle controller and performing rollback of a vehicle controller according to an embodiment of the present disclosure.

FIG. 4 is a flowchart of a method for generating rollback difference data of a vehicle controller and rollback of a vehicle controller, according to an embodiment.

In operation 410, the vehicle controller 20 receives difference data for updating from old version data to new version data from the server 1.

In operation 420, the main control unit 30 generates rollback difference data for a rollback from the new version data to the old version data by using the difference data and the old version data.

In operation 430, the main control unit 30 performs an update from the old version data to the new version data using the difference data.

When a rollback is required in operation 440, in operation 450, the main control unit 30 performs the rollback from the new version data to the old version data by using the rollback difference data.

Figure 5:
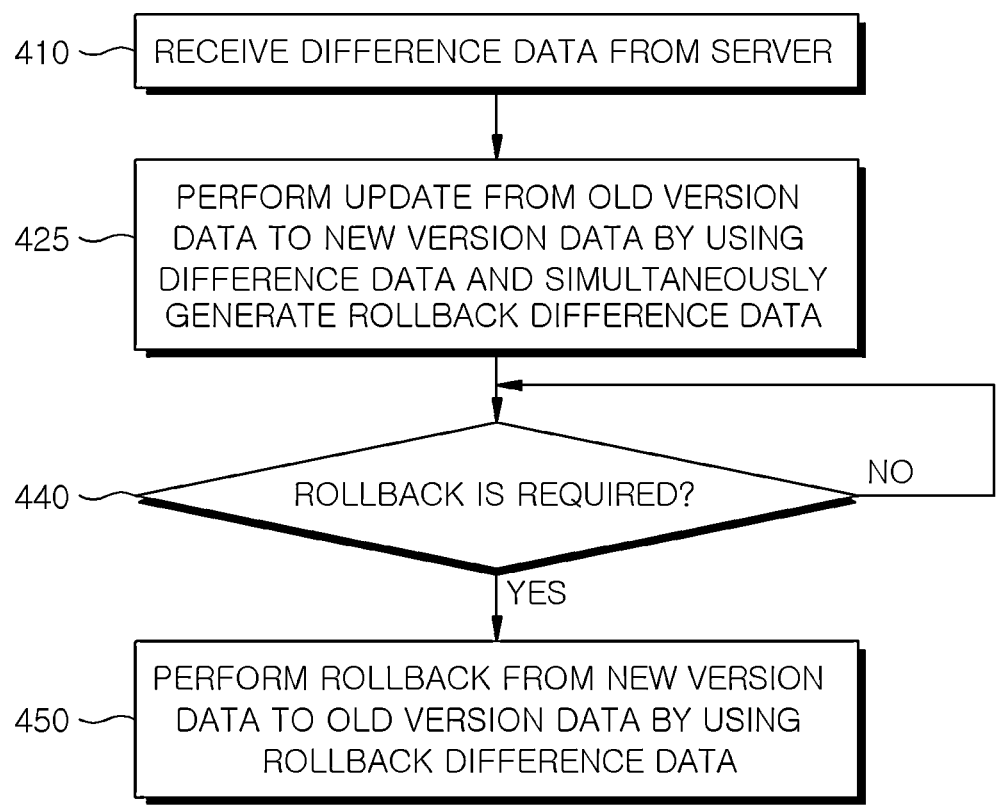
FIG. 5 is a flowchart of a method for generating rollback difference data of a vehicle controller and performing rollback of a vehicle controller according to another embodiment of the present disclosure.

FIG. 5 is a flowchart of a method for generating rollback difference data of a vehicle controller and rollback of a vehicle controller, according to another embodiment.

In operation 410, the vehicle controller 20 receives difference data for updating from old version data to new version data from the server 1.

In operation 425, the main control unit 30 performs an update from the old version data to the new version data using the difference data, and at the same time, the main control unit 30 generates rollback difference data for the rollback from the new version data to the old version data by using the difference data and the old version data.

When a rollback is required in operation 440, in operation 450, the main control unit 30 performs the rollback from the new version data to the old version data by using the rollback difference data.

Figure 6:
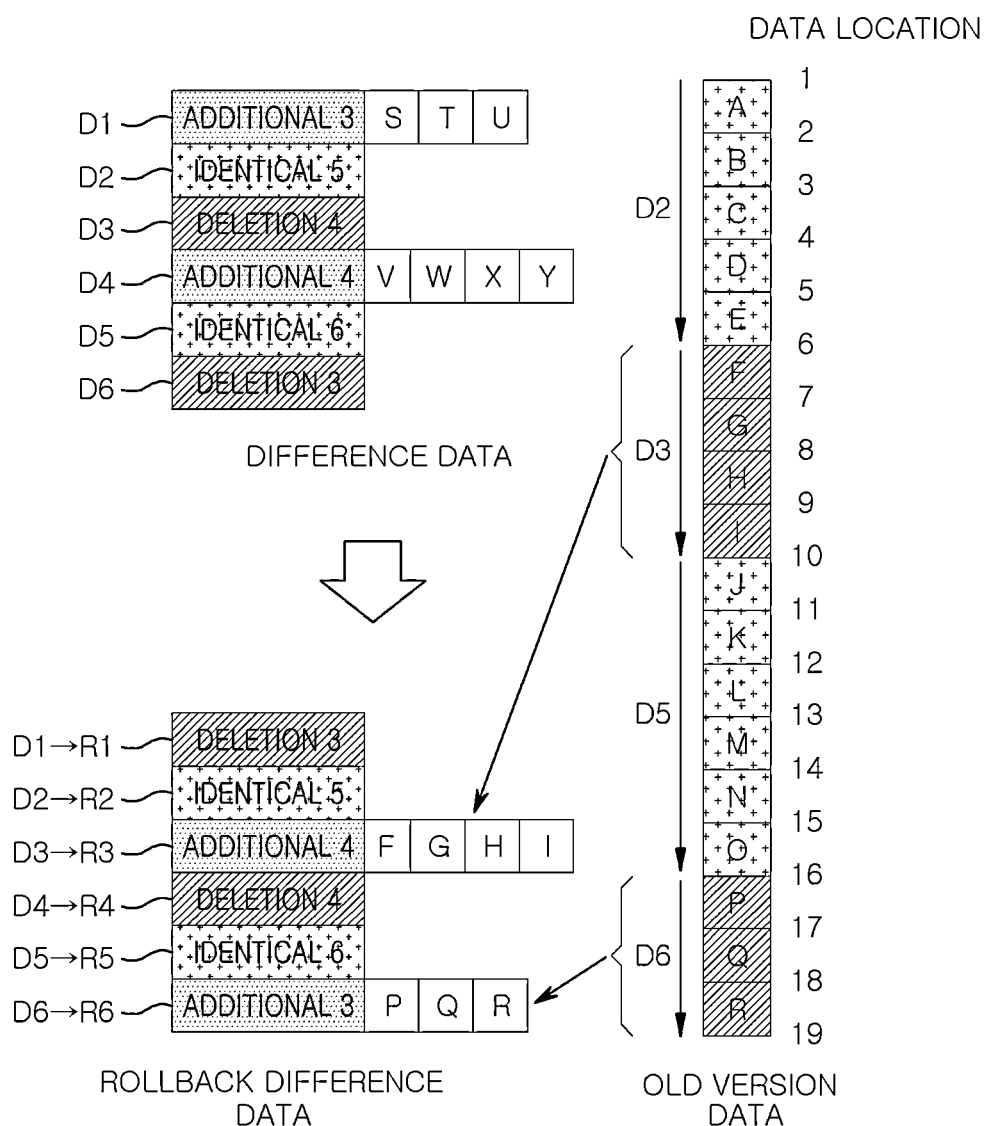
FIG. 6 is a diagram illustrating a process for generating rollback difference data by using difference data and old version data according to an embodiment of the present disclosure.

FIG. 6 is a diagram illustrating a of a process for generating rollback difference data by using the difference data and the old version data in operation 420 of FIG. 5, according to an embodiment.

Difference data may include a series of difference blocks D1 to D6. The difference blocks D1 to D6 may include additional difference blocks D1 and D4, identical difference blocks D2 and D5, and deletion difference blocks D3 and D6. The additional difference blocks D1 and D4 may include i) length information of additional data to be added to the new version data and ii) the additional data. The identical difference blocks D2 and D5 may include length information of the same data between the old version and the new version. The deletion difference blocks D3 and D6 may have length information of deleted data to be deleted from the old version data. For example, in the case of the additional difference block D1, the length of the additional data is 3 and the additional data are S, T, and U. In the case of the identical difference block D2, the length of the same data is 5. In the case of the deletion difference block D3, the length of the deleted data is 4. In the case of the additional difference block D4, the length of the additional data is 4 and the additional data are V, W, X, and Y. In the case of the identical difference block D5, the length of the same data is 6. In the case of the deletion difference block D6, the length of the deleted data is 3.

The rollback difference data may be generated by using the additional difference blocks D1 and D4, the identical difference blocks D2 and D5, the deletion difference blocks D3 and D6, and the old version data. Deletion difference blocks R1 and R4 having the same length information may be generated from the additional difference blocks D1 and D4. Identical difference blocks R2 and R5 having the same length information may be generated from the identical difference blocks D2 and D5. From the deletion difference blocks D3 and D6, additional difference blocks R3 and R6 having the same length information and additional data extracted from the old version data may be generated. Therefore, the rollback difference data also includes a series of difference blocks R1 to R6.

In order to generate rollback difference data, the main control unit 30 may manage an index indicating the data location of the old version data in the memory unit 50. The index may be maintained when generating a deletion difference block from an additional difference block. When the identical difference block is generated from the identical difference block, the index may be increased by the corresponding length information. When an additional difference block is generated from a deletion difference block, data of corresponding length information is extracted from old version data as additional data at a location indicated by the index, and the index may be increased by the corresponding length information.

The process of generating the rollback difference data from the difference data and the old version data illustrated in FIG. 6 is described in more detail as follows.

From the additional difference block D1, a deletion difference block R1 having the same length information of 3 is generated. In this case, the index is maintained at 1. From the identical difference block D2, the identical difference block R2 having the same length information of 5 is generated. In this case, the index becomes 6 increased by a length of 5. An additional difference block R3 having the same length information of 4 is generated from the deletion difference block D3, and here, data F, G, H, and I with a length of 4 are extracted from the location indicated by index 5 from the old version data as additional data and included in the additional difference block R3, and the index is increased by 4 to become 10.

From the additional difference block D4, a deletion difference block R4 having the same length information of 4 is generated. In this case, the index is maintained at 10. From the identical difference block D5, the identical difference block R5 having the same length information of 6 is generated. In this case, the index is increased by 6 to become 16. An additional difference block R6 having the same length information of 3 is generated from the deletion difference block D6, and here, data P, Q, and R with a length of 3 are extracted as additional data from the location indicated by index 16 from the old version data and included in the additional difference block R6, and the index is increased by 3 to become 19.

Figure 7:
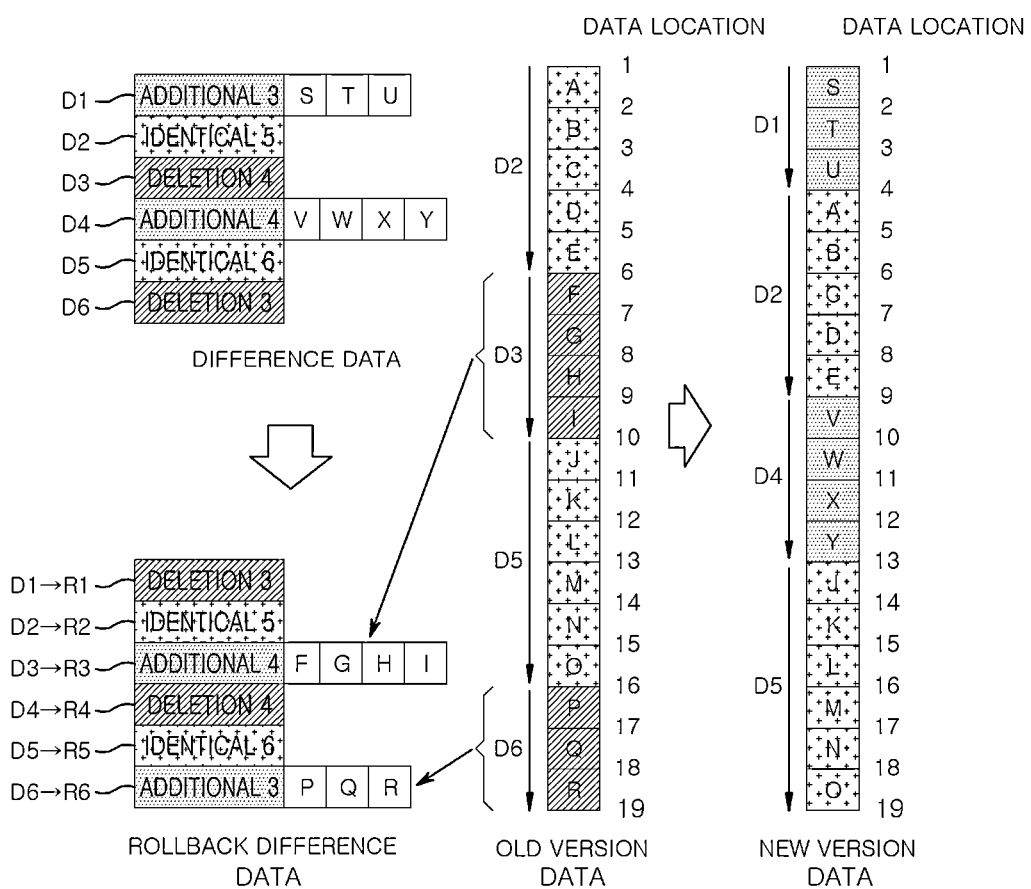
FIG. 7 is a diagram illustrating a process in which an update is performed from old version data to new version data by using difference data, and at the same time, rollback difference data is generated by using the difference data and the old version data, according to an embodiment of the present disclosure.

FIG. 7 is a diagram illustrating a process performed in operation 425 of FIG. 5 to perform an update from old version data to new version data by using the difference data, and at the same time, generate rollback difference data by using the difference data and the old version data.

In order to update from the old version data to the new version data and generate rollback difference data at the same time, the main control unit 30 may manage a first index indicating the data location of the old version data and a second index indicating the data location of the new version data in the memory unit 50.

When the additional difference block is applied in the update, the first index is maintained, the additional data is copied to the location indicated by the second index of the new version data, the second index is increased by the corresponding length information, and the deletion difference block is generated from the additional difference block.

When the identical difference block is applied in the update, data corresponding to the corresponding length information at the location indicated by the first index of the old version data is copied to the location indicated by the second index. Also, the second index is increased by the corresponding length information, the first index is increased by the corresponding length information, and the identical difference block is generated from the identical difference block.

When the deletion difference block is applied in the update, data of the corresponding length information is extracted from the location indicated by the first index of the old version data as additional data and an additional difference block is generated. Also, the first index is increased by the corresponding length information, and the second index is maintained.

The process of generating the new version data and the rollback difference data from the difference data and the old version data illustrated in FIG. 7 is described in more detail as follows.

When the additional difference block D1 is applied, the first index 1 is maintained, and the additional data S, T, and U are copied to the location indicated by the second index 1 of the new version data. Also, the second index 1 is increased by a length of 3 to become 4, and the deletion difference block R1 having length information of 3 is generated from the additional difference block D1.

When the identical difference block D2 is applied, data A, B, C, D, and E corresponding to length of 5 at the location indicated by the first index 1 of the old version data are copied to the location indicated by the second index 4 of the new version data. Also, the second index 4 is increased by a length of 5 to become 9, the first index 1 is increased by a length of 5 to become 6, and the identical difference block R2 having the length information of 5 is generated from the identical difference block D2.

When the deletion difference block D3 is applied, data F, G, H, and I with a length of 4 are extracted as additional data at the location indicated by the first index 6 of the old version data, and the additional difference block R3 having a length of 4 and data F, G, H, and I is generated. Also, the first index 6 is increased by a length of 4 to become 10, and the second index 9 is maintained.

When the additional difference block D4 is applied, the first index 10 is maintained, and the additional data V, W, X, and Y are copied to the location indicated by the second index 9 of the new version data. Also, the second index 9 is increased by a length of 4 to become 13, and the deletion difference block R4 having the length information of 4 is generated from the additional difference block D4.

When the identical difference block D5 is applied, the data J, K, L, M, N, and O corresponding to length of 6 at the location indicated by the first index 10 of the old version data are copied to the location indicated by the second index 13 of the new version data. Also, the second index 13 is increased by a length of 6 to become 19, the first index 10 is also increased by a length of 6 to become 16, and the identical difference block R5 having the length information of 6 is generated from the identical difference block D5.

When the deletion difference block D6 is applied, data P, Q, and R with a length of 3 are extracted as additional data at the location indicated by the first index 16 of the old version data and the additional difference block R6 having a length of 3 and data P, Q, and R is generated. Also, the first index 16 is increased by a length of 3 to become 19, and the second index 19 is maintained.

Figure 8:
FIG. 8 is a diagram illustrating a process in which rollback is performed from new version data to old version data by using rollback difference data according to an embodiment of the present disclosure.

FIG. 8 is a diagram illustrating a process in which rollback is performed from the new version data to the old version data by using the rollback difference data in operation 450 of FIG. 5, according to an embodiment.

In order to perform rollback from the new version data to the old version data by using rollback difference data, the main control unit 30 may manage the first index indicating the data location of the new version data and the second index indicating the data location of the old version data in the memory unit 50.

When the deletion difference block R1 is applied, the first index 1 is increased by a length of 3 to become 4, and the second index 1 is maintained.

When the identical difference block R2 is applied, data A, B, C, D, and E with a length of 5 at the location indicated by the first index 4 of the new version data are copied to the location indicated by the second index 1 of the old version data, the second index 1 is increased by a length of 5 to become 6, and the first index 4 is also increased by a length of 5 to become 9.

When the additional difference block R3 is applied, the first index 9 is maintained, the additional data F, G, H, and I are copied to the location indicated by the second index 6 of the old version data, and the second index 6 is increased by a length of 4 to become 10.

When the deletion difference block R4 is applied, the first index 9 is increased by a length of 4 to become 13, and the second index 10 is maintained.

When the identical difference block R5 is applied, the data J, K, L, M, N, and O with a length of 6 at the location indicated by the first index 13 of the new version data are copied to the location indicated by the second index 10 of the old version data, the second index 10 is increased by a length of 6 to become 16, and the first index 13 is also increased by a length of 6 to become 19.

When the additional difference block R6 is applied, the first index 19 is maintained, the additional data P, Q, and R are copied to the location indicated by the second index 16 of the old version data, and the second index 16 is increased by a length of 3 to become 19.

Referring to FIG. 8, it can be confirmed that the old version data rolled back from the new version data by using the rollback difference data is the same as the old version data of FIGS. 6 and 7.

Combinations of each block in the block diagram and each step in the flowchart attached to the present disclosure may be performed by computer program instructions. These computer program instructions may be embodied in a processor of a general purpose computer, special purpose computer, or other programmable data processing equipment, so that the instructions executed by the processor of the computer or other programmable data processing equipment generate means for performing the functions described in each block of the block diagram or in each step of the flowchart. These computer program instructions may also be stored in a computer-usable or computer-readable memory that may direct a computer or other programmable data processing equipment to implement a function in a particular manner, so that it is also possible that the instructions stored in the computer-usable or computer-readable memory produce articles containing instruction means for performing the function described in each block of the block diagram or in each step of the flowchart. The computer program instructions may also be mounted on a computer or other programmable data processing equipment, so that the instructions for performing a computer or other programmable data processing equipment by performing a series of operational steps on a computer or other programmable data processing equipment to create a computer-executed process to perform the computer or other programmable data processing equipment may provide operations for executing functions described in in each block of the block diagram and each operation of the flowchart.

Each block or each step may represent a portion of modules, segments, or codes including one or more executable instructions for executing specified logical function(s). It should also be noted that in some alternative embodiments, it is also possible for the functions mentioned in blocks or steps to occur out of order. For example, it is possible that two blocks or steps illustrated one after another may in fact be performed substantially simultaneously, or that the blocks or steps may sometimes be performed in the reverse order according to the corresponding function.

While the disclosure has been illustrated and described in detail with the help of the embodiments, the disclosure is not limited to the disclosed embodiments. Other variations may be deduced by those having ordinary skill in the art without leaving the scope of protection of the claimed disclosure.

Example embodiments have been described and illustrated in the drawings and the specification. The example embodiments were chosen and described in order to explain certain principles of the disclosure and their practical application, to thereby enable others skilled in the art to make and utilize various example embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A method for generating rollback difference data of a vehicle controller, the method comprising:
   receiving, from a server, difference data for updating from old version data to new version data; and
   generating, using the difference data and the old version data, rollback difference data for a rollback from the new version data to the old version data,
   wherein the rollback difference data includes a series of differential blocks, and wherein the difference blocks include i) an additional difference block having length information of additional data and additional data, ii) an identical difference block having length information of same data, and iii) a deletion difference block having length information of deletion data.

2. The method of claim 1, wherein:
   generating the rollback difference data includes generating i) a deletion difference block having the length information from the additional difference block, ii) an identical difference block having the length information from the identical difference block, and iii) an additional difference block having the length information from the deletion difference block and additional data extracted from the old version data.

3. The method of claim 2, wherein generating the rollback difference data is performed in advance before the update.

4. The method of claim 3, wherein:
   generating the rollback difference data includes managing an index indicating a data location of the old version data, wherein
      when the deletion difference block is generated from the additional difference block, the index is maintained, and
      when the identical difference block is generated from the identical difference block, the index is increased by the corresponding length information.

5. The method of claim 4, wherein when the additional difference block is generated from the deletion difference block, i) data corresponding to corresponding length information is extracted from a location indicated by the index from the old version data as the additional data, and ii) the index is increased by the corresponding length information.

6. The method of claim 2, wherein generating the rollback difference data comprises generating the rollback difference data simultaneously with the update.

7. The method of claim 6, wherein generating the rollback difference data simultaneously with the update includes managing i) a first index indicating a data location of the old version data and ii) a second index indicating a data location of the new version data, and
   wherein:
      when the additional difference block is applied in the update, i) the first index is maintained, ii) the additional data is copied to a location indicated by the second index of the new version data, iii) the second index is increased by corresponding length information, and iv) the deletion difference block is generated from the additional difference block, and
      when the identical difference block is applied in the update, i) data of the corresponding length information of the location indicated by the first index of the old version data is copied to the location indicated by the second index of the new version data, ii) the second index is increased by the corresponding length information, iii) the first index is increased by the corresponding length information, and iv) the identical difference block is generated from the identical difference block.

8. The method of claim 7, wherein when the deletion difference block is applied in the update, i) data of the corresponding length information is extracted from the location indicated by the first index of the old version data as the additional data to generate the additional difference block, ii) the first index is increased by the corresponding length information, and iii) the second index is maintained.

9. A method for rollback of a vehicle controller, the method comprising:
   receiving, from a server, difference data for updating from old version data to new version data;

generating, using the difference data and the old version data, rollback difference data for a rollback from the new version data to the old version data; and performing rollback from new version data to old version data by using the rollback difference data, wherein the rollback difference data includes a series of differential blocks, and wherein the difference blocks include i) an additional difference block having length information of additional data and additional data, ii) an identical difference block having length information of same data, and iii) a deletion difference block having length information of deletion data.

10. The method of claim 9, wherein performing the rollback includes managing a first index indicating a data location of the new version data and a second index indicating a data location of the old version data, and wherein:

when the additional difference block is applied in the rollback, i) the first index is maintained, ii) the additional data is copied to a location indicated by the second index of the old version data, and iii) the second index is increased by corresponding length information, when the identical difference block is applied in the rollback, i) data of the corresponding length information of a location indicated by the first index of the new version data is copied to a location indicated by the second index of the old version data, ii) the second index is increased by the corresponding length information, and iii) the first index is increased by the corresponding length information, and when the deletion difference block is applied in the rollback, i) the first index is increased by the corresponding length information, and ii) the second index is maintained.

* * * * *